United States Patent [19]
Diehl et al.

[11] Patent Number: 6,058,438
[45] Date of Patent: May 2, 2000

[54] METHOD AND APPARATUS FOR PERFORMING HIGH SPEED DATA TRANSFERS BETWEEN A HOST MEMORY AND A GEOMETRY ACCELERATOR OF A GRAPHICS MACHINE

[75] Inventors: Michael R. Diehl; Maynard D. Hammond; David L. McAllister, all of Fort Collins, Colo.

[73] Assignee: Hewlett-Packard Company, Palo Alto, Calif.

[21] Appl. No.: 09/020,190

[22] Filed: Feb. 6, 1998

[51] Int. Cl.$^7$ ........................................................ G06F 13/28
[52] U.S. Cl. .................... 710/24; 710/23; 710/26; 345/503; 345/526
[58] Field of Search ...................... 710/23, 24, 26, 710/128; 345/503, 526

[56] References Cited

U.S. PATENT DOCUMENTS

| | | | |
|---|---|---|---|
| 5,347,634 | 9/1994 | Herrell et al. | 395/511 |
| 5,392,391 | 2/1995 | Caulk, Jr. et al. | 395/503 |
| 5,404,463 | 4/1995 | McGarvey | 710/128 |
| 5,448,702 | 9/1995 | Garcia, Jr. et al. | 710/100 |
| 5,644,784 | 7/1997 | Peek | 710/24 |

*Primary Examiner*—Thomas C. Lee
*Assistant Examiner*—Albert Wang

[57] ABSTRACT

A system is provided for achieving high speed data transfers from a host memory to an ancillary processor, where the ancillary processor is preferably a geometry accelerator of a graphics machine. In accordance with a preferred embodiment, the system includes at least one memory segment having at least one enable bit and a starting address. The system further includes a data transfer queue defined in a portion of the host memory beginning at the starting location, where the data transfer queue has at least one header portion and at least one data portion, the header portion including at least one data ready bit that is indicative of whether the associated block of data is ready to be transferred to the ancillary processor. Finally, the system includes a controller, responsive to the enable bit, configured to transfer data directly from the data transfer queue to the ancillary processor, the controller being operative to evaluate the at least one data ready bit and transfer the associated block of data from the queue to the ancillary processor if the at least one data ready bit indicates that the data is ready for transfer.

18 Claims, 4 Drawing Sheets

METHOD AND APPARATUS FOR PERFORMING HIGH SPEED DATA TRANSFERS BETWEEN A HOST MEMORY AND A GEOMETRY ACCELERATOR OF A GRAPHICS MACHINE

BACKGROUND OF THE INVENTION

1. Field of the Invention

The present invention generally relates to computer systems, and more particularly to a system and method for performing high speed data transfers between a host memory and a graphics accelerator in a computer graphics system.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of each three-dimensional object to be rendered are defined by the host CPU in terms of primitive data. For example, when the primitive is a triangle, the host computer may define the primitive in terms of the X, Y and Z coordinates of its vertices, as well as in terms of the red, green, blue and alpha (R, G, B and $\alpha$) color values of each vertex. Alpha is a transparency value. Additional primitive data may be used in specific applications. Rendering hardware interpolates the primitive data to compute the display screen pixels that represent each primitive, and the R, G, B and $\alpha$ values for each pixel.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. The geometry accelerator typically comprises a transform component which receives vertex data from host or system memory via the CPU, a clipping component, an illumination component, and a plane equations component. The transform component performs transformations on the vertex data received from the CPU, such as rotation and translation of the image space defined by vertex data. The clipping component clips the vertex data so that only vertex data relating to primitives that make up the portion of the view that will be seen by the user is kept for further processing. The illumination or lighting component calculates the final colors of the vertices of the primitives based on the vertex data and based on lighting conditions. The plane equations component generates floating point equations which define the image space within the vertices. The floating point equations are later converted into fixed point equations and the rasterizer and texture mapping hardware generate the final screen coordinate and color data for each pixel in each primitive.

With the foregoing as providing general background into computer graphics systems, it is well known in the art that a vast amount of primitive data is generally processed by the graphics machine (e.g., geometry accelerator) in a computer graphics system. As is further known, the transfer of this vast amount of data from the host memory to the graphics machine for processing generally presents a bottleneck in the system performance. Specifically, the primitive data is generally routed from the system memory to the graphics machine via the CPU bus, which has bandwidth limitations that significantly limit the transfer rate.

Further still, some computer systems, by design, result in further performance degradation. For example, a computer system running under Microsoft Windows NT (NT) operating system, as opposed to a Unix operating system, has additional overhead associated with context switching. Context switching occurs each time the system switches from kernel space to user space (or from user space to kernel space). As a specific example, when a system switches from kernel space to user space in order to transfer graphics data to the graphics machine, the CPU must save context data (i.e., CPU state information) and build a buffer of graphics data, before transferring graphics data from the host memory to the graphics machine. Once the graphics data transfer is complete, this context data (e.g., CPU state information) must be transferred back to the CPU so that it may "seamlessly" resume operation at the same point in its "kernel" state. This context switching adds further overhead, and thus performance degradation, to the system.

Accordingly, it is desired to provide a computer graphics system that overcomes these shortcomings of the prior art, and one which achieves improved performance over prior art systems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for achieving high speed data transfers from a host memory to an ancillary processor, where the ancillary processor is preferably a geometry accelerator of a graphics machine. In accordance with a preferred embodiment, the system includes at least one register having at least one enable bit and a starting address. The system further includes a data transfer queue defined in a portion of the host memory beginning at the starting location, where the data transfer queue has at least one header portion and at least one data portion, the header portion including at least one data ready bit that is indicative of whether the associated block of data is ready to be transferred to the ancillary processor. Finally, the system includes a controller, responsive to the enable bit, configured to transfer data directly from the data transfer queue to the ancillary processor, the controller being operative to evaluate the at least one data ready bit and transfer the associated block of data from the queue to the ancillary processor if the at least one data ready bit indicates that the data is ready for transfer.

In accordance with the preferred embodiment, the data transfer queue includes a plurality of header portions and a corresponding plurality of data portions. Further, each header portion includes at least one data ready bit indicative of whether the corresponding data block is ready for transfer to the ancillary processor. In operation, the state of the enable bit is controlled by a host processor. Similarly, the state of each data ready bit is controlled by a host processor. Specifically, in the preferred embodiment, the state of each data ready bit is set by the host processor, but cleared by the ancillary processor, or controller.

In accordance with another aspect of the present invention, a system is provided having both a host processor and an ancillary processor, and the invention is directed to an apparatus for performing high speed data transfers from a host memory to the ancillary processor. In accordance with this aspect, the apparatus includes a first communication path between the host processor and the host memory, and a second communication path between the host memory and the ancillary processor. A controller is configured to control the transfer of information between the host memory and the ancillary processor via the second communication path. To achieve this aspect, the controller includes determining means for determining whether a block of data is ready to be transferred from the host memory to the ancillary processor, controlling means responsive to the determining means for controlling the transfer of the block of data, and means for controlling the operation of the determining means and controlling means. In the preferred embodiment the means for controlling controls the operation of the determining means and controlling means to form a circular queue of data words within the host memory are sequentially transferred to the ancillary processor.

In operation, the apparatus operates to identify an action from the host processor that initiates the start of a direct memory access (DMA) transfer from the host memory to the ancillary processor via the second communication path. In the same way, the apparatus includes means for identifying an action from the host processor for terminating the DMA transfer from the host memory to the ancillary processor via the second communication path. In the preferred embodiment, the determining means includes a register having at least one bit that is indicative of whether an associated block of data is ready to be transferred to the ancillary processor. The controlling means includes electronic circuitry configured to controllably transfer blocks of data directly from the host memory to the ancillary processor along the second communication path.

In accordance with yet another aspect of the invention, a method is provided for performing high speed delivery of commands and data from a host memory to a graphics machine in a computer graphics system. In accordance with the preferred embodiment, the method includes the step of identifying a command received from the host processor that enables the start of a direct memory access (DMA) transfer, the command indicating a starting address within the host memory for the transfer. The method then evaluates a first portion of data that is stored in a fixed location in reference to the starting address to determine whether a first block of data is ready to be processed. The method then delivers the block of data directly from the host memory to the graphics accelerator chip for processing, if the evaluating step indicates that the first block of data is ready for processing. Otherwise, the method waits for a time-out period (preferably a programmable time-out period) and returns to the evaluating step. Then the method evaluates a subsequent portion of data that is stored in a fixed location in reference to the previously evaluated portion of data to determine whether a subsequent block of data is ready to be processed. The method then repeats the delivering and evaluating steps, until the DMA transfer is complete. Specifically, the delivering and evaluating steps are repeated until the host processor disables the DMA transfer.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
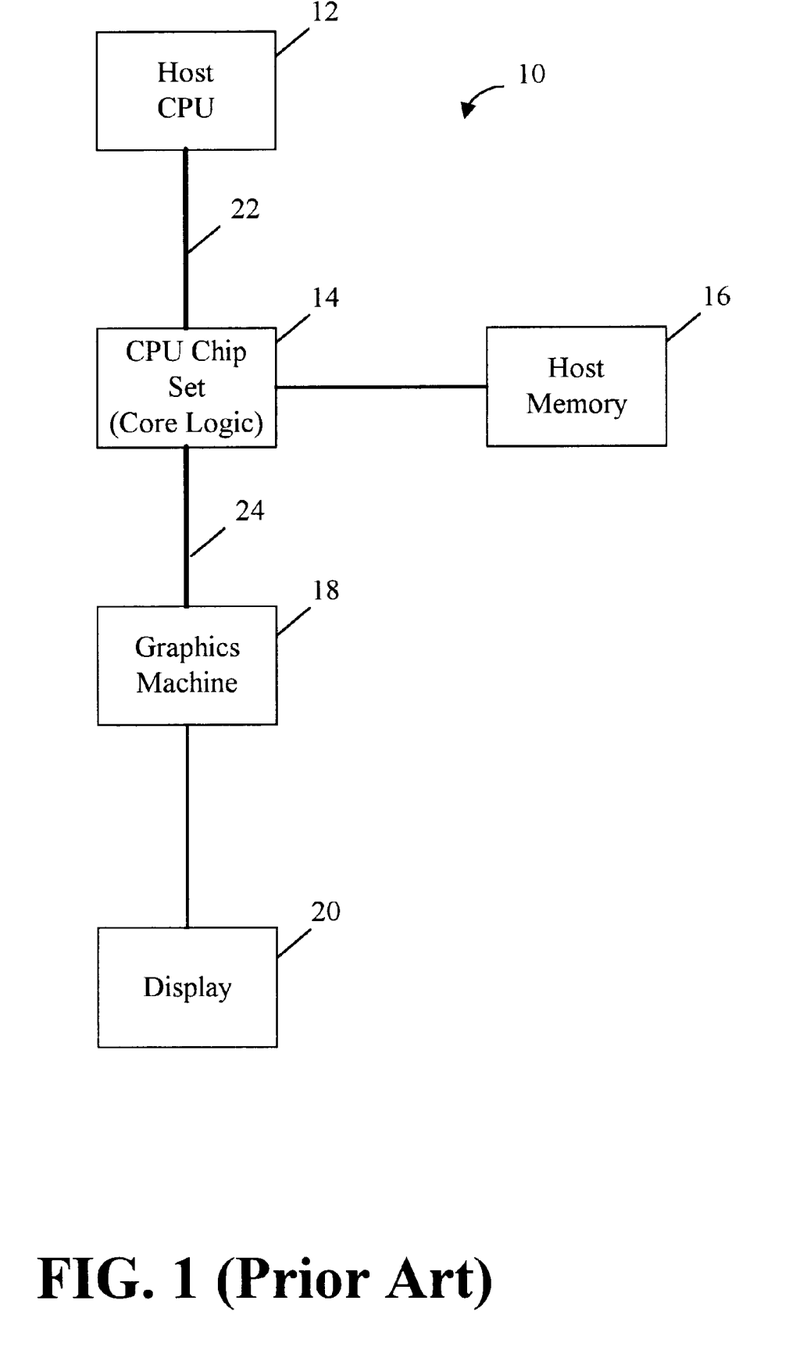
FIG. 1 is a block diagram showing primary components of a computer graphics system, as known in the prior art.

Turning now to the drawings, FIG. 1 shows a block diagram of a portion of a computer graphics system, generally designated by reference numeral 10, as is known in the prior art. A central processing unit (CPU) 12, such as a microprocessor, provides the primary processing capabilities of most computing systems. As is known, the CPU 12 generally interfaces with other devices through support circuitry, which is designated as a CPU Chip Set 14. As is known and understood, this CPU chip set 14 often includes bus drivers, latches, chip enable circuitry, direct memory access (DMA) controllers, etc. Also illustrated in FIG. 1 is a host memory 16, a graphics machine 18, and a display 20, such as a cathode ray tube (CRT) or a liquid crystal display (LCD).

A CPU bus 22 extends between the CPU 12 and the various components of the CPU chip set 14. Data or other information that passes to or from the CPU 12 to other circuit components is communicated across the CPU bus 22. For example, data exchanges between the CPU 12 and the memory 16 occur via the CPU bus 22. Likewise, a graphics bus 24 typically extends between the graphics machine 18 and the various components of the CPU chip set 14. Data or other information that passes to or from the graphics machine 18 to other circuit components occur via the graphics bus 24.

Figure 2:
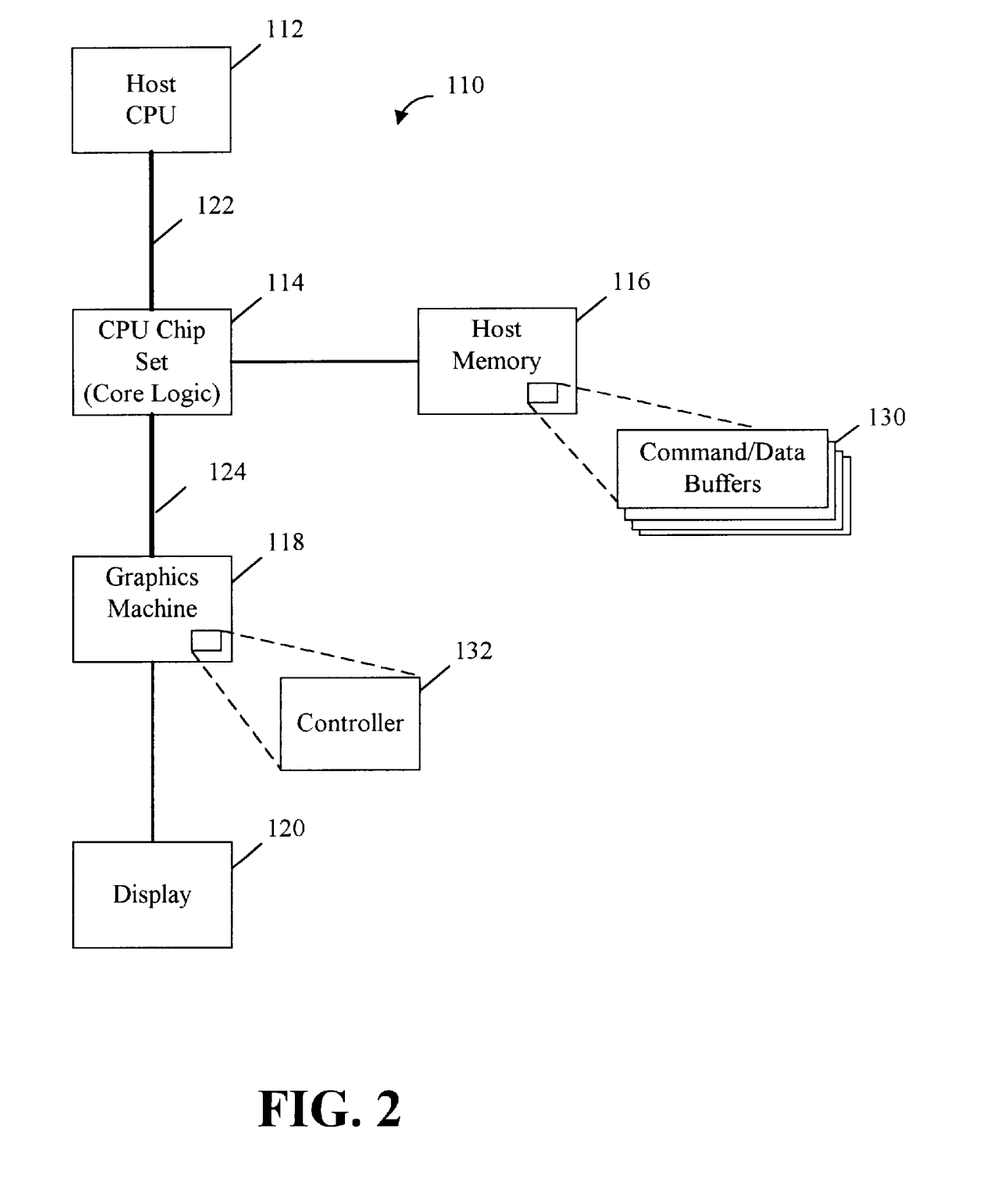
FIG. 2 is a block diagram showing primary components of a computer graphics system, as modified by the present invention.

Reference is now made to FIG. 2, which shows a block diagram similar to that shown in FIG. 1, but further shows a set of command buffers 130 and a controller 132 within the graphics machine 118. In short, the controller 132 of the present invention recognizes when a block of graphic or primitive data is to be transferred from memory 116 to the graphics machine 118. When the initiation of such a block transfer is detected, the controller 132 assumes control of the transfer from the CPU 112. This allows the transfer to take place exclusively via the higher speed graphics bus 124, and thus avoiding transfers via the more band-limited CPU bus 122. Furthermore, disengaging the CPU 112 in this manner eliminates the need for the CPU 112 to save its state information, and thus eliminates the delays otherwise resulting from context switching.

In accordance with the preferred embodiment, a set of command buffers 130 are utilized to implement the inventive features of the present invention, although alternative embodiments may be implemented consistent with the broader concepts and teachings of the present invention. More specifically, the command buffers comprise a series of memory locations that are monitored by the controller 132. In this way, the CPU may write an encoded command into a memory location corresponding to a command buffer 130 to inform the controller 132 of, for example, the starting address of the data to be transferred from memory 116 to the graphics machine 118.

Stated another way, the present invention implements the ability of a computer graphics system to perform DMA from host memory 116 to the graphics machine 118. Preferably, the CPU 112 creates a queue of command/data buffers 130 in memory 116. As will be appreciated, the size of the queue and the size of each command/data buffer 130 is flexible and may be programmably configurable. Preferably, however, the queue and the buffer size will be powers of 2 (e.g., size=$2^n$), and the command/data buffer will be aligned on a "queue sized" boundary. As should be appreciated, this queue and buffer size/alignment simplifies the implementation. However, other sizes and alignments could be implemented. Thus, for example, if the size of the queue is defined to be 4 kilobytes, the queue will preferably be aligned on a 4 kilobyte boundary.

Figure 3:
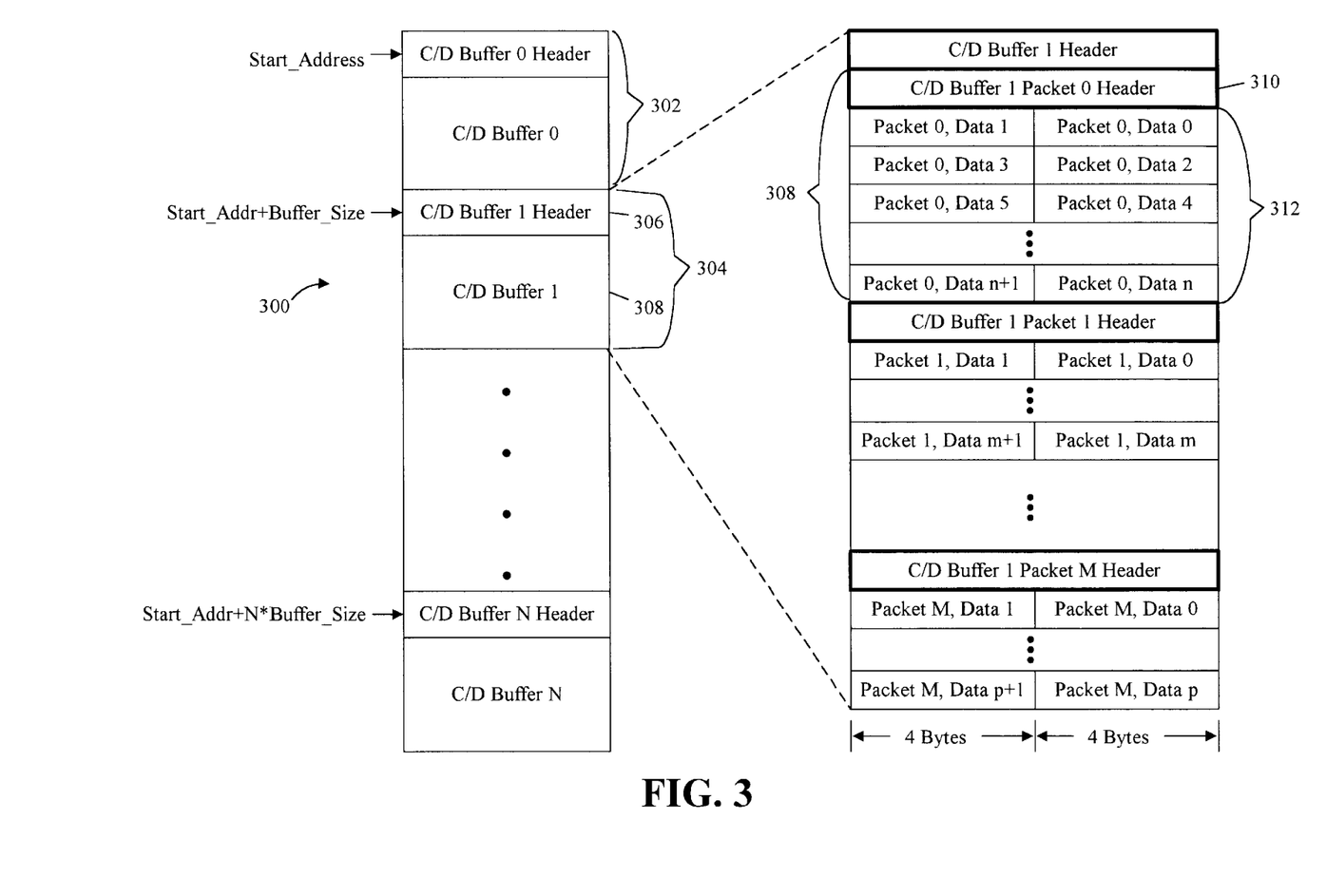
FIG. 3 is a block diagram illustrating memory and register organization of a portion of the memory in a computer graphics system constructed in accordance with the present invention.

The structure and format of a the command/data buffer queue 300 of the preferred embodiment is illustrated in FIG. 3. As illustrated, the queue 300 includes a plurality of command/data buffers 302, 304, etc., wherein each command/data buffer 300 further comprises a buffer header 306 and main buffer or buffer body 308. More particularly, the buffer body 308 comprises a plurality of packets, each of which is defined by a packet header 310 and a plurality (n) of data elements.

In operation, the process of executing the queue 300 of command/data buffers 302, 304 begins with the CPU writing control values to DMA control registers, which will be discussed in more detail below. Preferably, the DMA control registers specify the host memory start location of the first command/data buffer in the queue 300, the queue size, the command/data buffer size, a sleep count, and a valid flag. The DMA process is initiated by the CPU 114 setting a DMA enabled bit in a control register, which register is monitored by the controller 132 (Steps 402 and 412 of FIG. 4).

Figure 4:
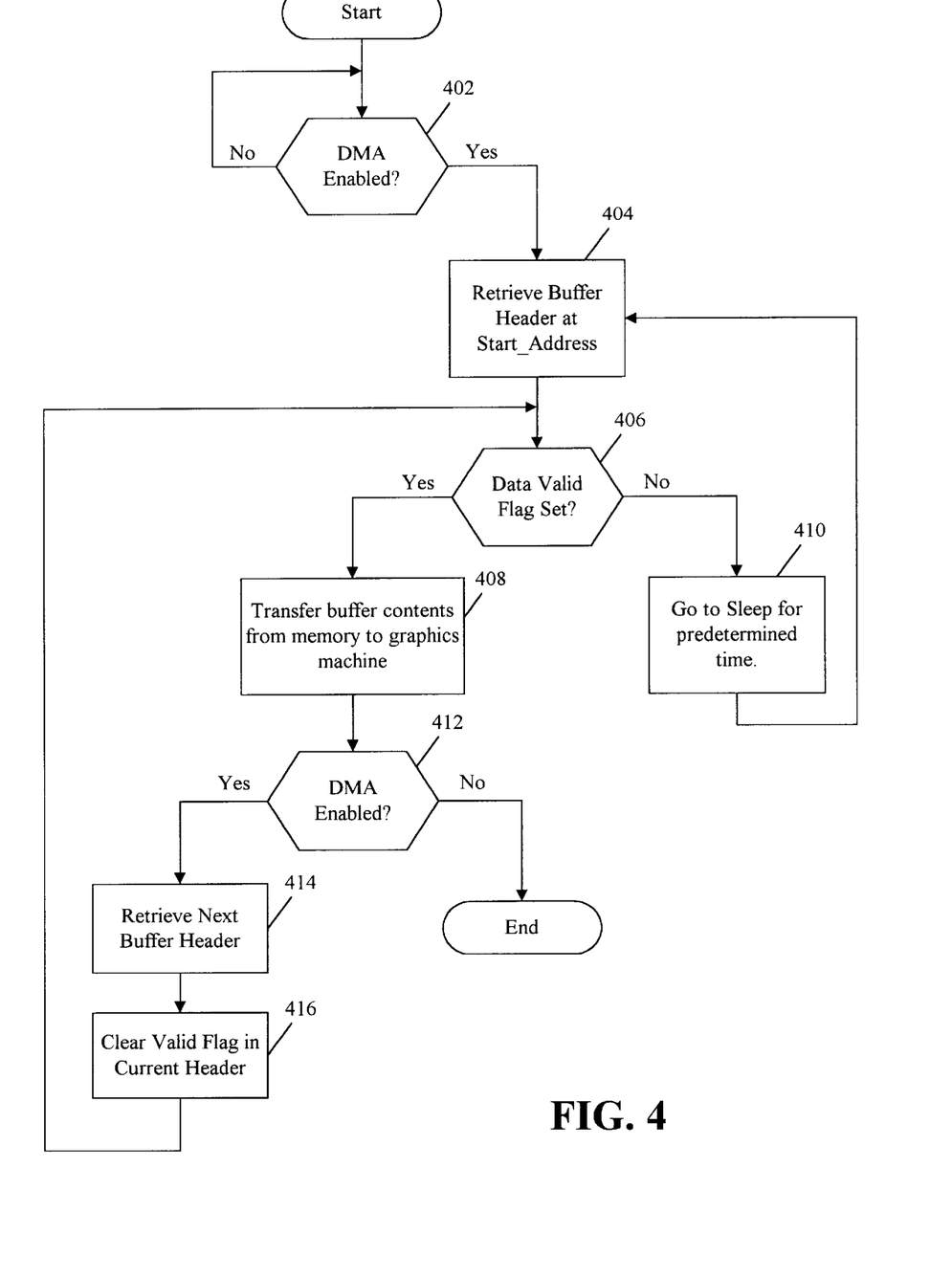
FIG. 4 is a flowchart illustrating the top-level functional operation of a computer graphics system operating in accordance with the present invention.

Upon initiation of the DMA process, the controller 132 begins processing the queue by checking a "valid" flag in the buffer header 306 (Steps 404 and 406 of FIG. 4). If the "valid" flag is a "1", for example, then the controller 132 processes that buffer 308—i.e., transfers from memory 116 and processes the data in that buffer (Step 408 of FIG. 4). Upon completion of the processing of that buffer 308, the controller 132 initiates a request for the next command/data buffer header (Step 414 of FIG. 4), and writes a "0", for example, into the valid flag (Step 416) of the previous command/data buffer header 306, thereby clearing that flag.

Then, the controller 132 examines the "valid" flag of the newly received buffer header to continue the processing as described above with the previous buffer. The controller continues this process until it receives a buffer header having a cleared, or "0", valid flag, at which time the controller 132 enters a "sleep" mode (Step 410 of FIG. 4).

The controller remains in this sleep mode for a predetermined amount of time, which may be controlled by a programmable counter. Once the "sleep" time has expired, the controller 132 again retrieves the previously retrieved buffer header and evaluates its "valid" flag. If the flag is set (e.g., "1"), then the controller 132 retrieves the associated buffer data and processes the buffer. As before, the controller 132 retrieves the next buffer header and clears the valid flag in the current buffer header. If the "next" valid flag is clear (e.g., "0"), then the controller again goes to sleep for the predetermined sleep period, before again retrieving that buffer header and checking the valid flag. If it is set, the next buffer is processed and the loop continues. (As mentioned above, the data valid flag in each buffer header is set by the host CPU 112 and is cleared by the controller 132).

The above described process, which is graphically illustrated in the flowchart of FIG. 4, is repeated until the end of the queue 300 is reached. At that time, the controller retrieves the first buffer header, located at "Start_Address". In this way, the queue 300 forms a circular queue, and DMA processing of the queue continues until such time as the CPU disables a DMA valid bit, preferably located within the graphics machine 118.

Having described the top-level processing operation, once the DMA is initiated by the CPU 114, the controller 132 operates to parse the command/data buffer queue 300 at the address in memory 116 specified by the CPU 114. At this starting location, the controller 132 locates the first buffer to be processed. At the first location is a header word that contains the information necessary for the controller 132 to execute the first command/data buffer. Specifically, the header informs the controller 132 as to how many quad (8-byte) words are contained in the command/data buffer 308. Following the buffer header, then, are a plurality of packet headers 310 and packet data 312. Preferably the packet headers 310 are aligned on quad-word boundaries and contain information that the controller 132 uses to process the packet data. This information includes, for example, the starting internal address at which to begin writing the packet data, the number of 32-bit pieces of data in the packet, a valid flag, and other items. In the preferred embodiment, if the second bit of the internal address, specified by the packet header, is "1" (not quad-word aligned), then the first piece of data within the packet is written to the upper 4-bytes of the quad word. In FIG. 3, the upper 4 bytes of the quad word are the odd-numbered data words. If the second bit of the internal address, specified by the packet header, is "0" (quad-word aligned), then the first piece of data within the packet is written to the lower 4-bytes of the quad word. Thereafter, the remaining packet data words are packed sequentially directly following the first data word.

To more particularly describe the command/data buffer header 306 of the presently preferred embodiment, reference is made to Tables 1 and 2 below, which illustrate the organization of data bits within a segment of adjacent memory locations in host memory 116.

TABLE 1

| MSB | | | | | | | | | | | | | | | LSB |
|---|---|---|---|---|---|---|---|---|---|---|---|---|---|---|---|
| \multicolumn{16}{c}{C/D Buffer Header Low-Order 2 Bytes} | | | | | | | | | | | | | | | |
| 15 | 14 | 13 | 12 | 11 | 10 | 9 | 8 | 7 | 6 | 5 | 4 | 3 | 2 | 1 | 0 |
| \multicolumn{12}{l}{C/D Buffer Quad Word Count (QWCnt)} | | | | | | | | | | | | W | K | S | V |

TABLE 2

| Field | Bits | Function |
|---|---|---|
| QWCnt | 15:8 | Data Count. The number of valid quad words in the C/D buffer following this header. QWCnt is less-than or equal to the C/D buffer size value that is specified in the C/D size register. |
| Reserved | 7:4 | |
| W | 3 | Wrap bit. A "1" written for this flag causes C/D buffer execution to "wrap" back to the C/D/ buffer queue start address, following the execution of the present C/D buffer. |
| K | 2 | Keep (valid) bit. A "1" written for this flag inhibits the controller from clearing the V (valid) flag upon completion of C/D/ buffer processing. |
| S | 1 | Stop. A "1" written for this flag terminates the processing of the C/D buffer queue, following the execution of the current buffer. Once DMA is terminated, the V (valid) bit in the low order start address must be asserted to re-start DMA. |
| V | 0 | C/D buffer valid flag. |

Specifically, Table 1 shows the lower-order sixteen bits of the C/D (command/data) buffer header 306. The remaining, higher-order bits are not utilized in the presently preferred embodiment and are therefore not shown. As denoted within Table 2, bits 8 through 15 specify a data count, which is the number of valid quad words contained within the associated C/D buffer 308. Bits 0 through 3 specify different operational flags, including a wrap flag, a keep flag, a stop flag, and a valid flag. The wrap flag, if set, causes the C/D buffer execution to begin (or wrap) back at the start addressed of the C/D buffer queue 300. The keep flag, if set, inhibits the controller 132 from clearing the valid flag of bit 0. The stop flag, if set, terminates processing of the C/D buffer queue 300, after executing the current buffer.

In similar fashion, reference is made to Table 3, immediately below, to describe the structure (organization of adjacent data bits in memory) of the C/D packet header 306.

TABLE 3

| Field | Bits | Function |
|---|---|---|
| Reserved | 63:58 | Reserved - All bits set to zero. |
| Int_Addr | 57:34 | The internal address where the first data word in the packet should be stored. Subsequent data words in the packet are stored sequentially thereafter (at double-word locations). |
| Reserved | 33:16 | Reserved - All bits set to zero. |
| PacketDC | 15:8 | The number of 4-byte data words following this header. A value of zero in this field represents a "NULL" packet and the controller proceeds with the next CD packet header. |
| Reserved | 7:1 | Reserved All bits set to zero. |
| NC | 0 | No count. If this flag is set to a "1", it will inhibit the controller from incrementing the internal address (at which the DMA return data is stored. Thus returning all data from the DMA is written to the same internal graphics location. |

Finally, reference is made to Table 4, which illustrates adjacent memory locations that define the bits of the DMA.

TABLE 4

| Field | Bits | Function |
|---|---|---|
| Reserved | 31:4 | Reserved - All bits set to zero. |
| CDBDMAH | 3:0 | The high order bits [N:32] of the C/D buffer start address in host memory. (where N is the address bit count. For example N=48 for 48 bit addresses, 36 for 36 bit addresses, etc.) |
| LOSA | 31:3 | Low order start address bits. In conjunction with the high-order address bits, specified the host memory 36-bit C/D buffer start address. |
| Reserved | 2:1 | Reserved for future use. |
| DMA_EN | 0 | The DMA_EN bit must be set to enable the DMA process. Clearing this bit disables the DMA process/ capability. |

As shown, the lowest order bit (DMA_EN) is the DMA enable bit. This bit is set by the host CPU 112, to initiate the DMA transfer. The controller 132 recognizes when this bit is set and assumes control of the DMA transfer from host memory 116 to the graphics machine 118, until this bit is again disabled by the host CPU 112. Bits 3–31, of the low order four-byte memory locations define the low order start address bits, while bits 0–3 of the high order four byte memory locations define the high order start address bits. Thus, together, bits 3–31 of the low order four-byte memory locations and bits 0–3 of the high order four byte memory locations define a 36-bit command/data buffer start address. The size of the start address may be varied by converting reserved bits to CDBDMAH bits, and vice versa. Specifically, this is the address of C/D buffer 0 header, denoted in FIG. 3 by the label "Start_Address".

At least two additional memory segments (adjacent locations) are provided in connection with the preferred embodiment: these are the C/D Size segment and the C/D Sleep Count segment, and the preferred form of these memory locations is illustrated below in Tables 5 and 6.

TABLE 5

| Field | Bits | Function |
|---|---|---|
| QSize | 31:27 | Qsize is the size in 8-byte words of the C/D buffer queue residing in host memory. |
| | 26:16 | All bits set to zero. This restriction means that the minimum size of the queue is 4K quad-words. If the first C/D buffer exists at address: StartAddr, then the C/D Buffer Queue extends to address StartAddr+QueueSize−1. The controller then implements a "circular queue" where StartAddr and StartAddr+QueueSize point to the same location. |
| CDBSize | 15:0 | CDBSize is the size in Quad (8-byte) words between each C/D buffer header. CDBSize is a power of 2. If a C/D buffer header exists at some address:Addr, then the next CDBuffer Header will be at address:Addr+BufferSize. This field specifies the distance between C/D Buffer Headers not the number of valid entries. The number of valid Quad Words contained in the C/D Buffer is specified by QWCnt in the C/D Buffer Header. CDBSize must be greater than or equal to QWCnt. |

TABLE 6

| Field | Bits | Function |
| --- | --- | --- |
| CDSleep | 31:0 | CDSleep is written with a value which represents the number of interface clocks between the times where the DMA controller checks the C/D Buffer Header in host memory for it's valid flag. |

In short, Tables 5 and 6 specify the size of the C/D Buffer Queue and the sleep count. As described above, as the controller 132 processes the queue 300, if the buffer valid flag (Table 2) is cleared for the corresponding buffer, the controller 132 goes to sleep for a predetermined period of time before again evaluating the buffer valid flag. This predetermined period of time is defined by the sleep count of Table 6. In one embodiment, this count may be loaded into a timer. Once the timer times out, then the controller 132 again checks the buffer valid flag.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a system having both a host processor and a geometry accelerator of a graphics machine, an apparatus for performing high speed data transfers from a host memory to the geometry accelerator comprising:

a first communication path between the host processor and the host memory;

a second communication path between the host memory and the geometry accelerator;

a controller configured to control the transfer of information between the host memory and the geometry accelorator via the second communication path, the controller having:

determining means for determining whether a block of data is ready to be transferred from the host memory to the geometry accelorator;

controlling means responsive to the determining means for controlling the transfer of the block of data; and means for controlling the operation of the determining means and controlling means whereby a circular queue of data words within the host memory are sequentially transferred to the geometry accelorator.

2. The apparatus as defined in claim 1, further including first identifying means for identifying an action from the host processor for initiating the start of a direct memory access (DMA) transfer from the host memory to the geometry accelorator via the second communication path.

3. The apparatus as defined in claim 1, further including second identifying means for identifying an action from the host processor for terminating the DMA transfer from the host memory to the geometry accelerator via the second communication path.

4. The apparatus as defined in claim 1, wherein the determining means includes a memory segment having at least one bit that is indicative of whether an associated block of data is ready to be transferred to the geometry accelerator.

5. The apparatus as defined in claim 1, wherein the controlling means includes electronic circuitry configured to control ably transfer blocks of data directly from the host memory to the geometry accelorator along the second communication path.

6. A system for achieving high speed data transfers from a host memory to a geometry accelerator of a graphics machine comprising:

at least one memory segment having at least one enable bit and a starting address;

a data transfer queue defined in a portion of the host memory beginning at the starting location, the data transfer queue having at least one header portion and at least one data portion, the header portion including at least one data ready bit that is indicative of whether the associated block of data is ready to be transferred to the geometry accelerator, and a controller responsive to the enable bit, configured to transfer data directly from the data transfer queue to the geometry accelerator, the controller being operative to evaluate the at least one data ready bit and transfer the associated block of data from the queue to the geometry accelerator if the at least one data ready bit indicates that the data is ready for transfer.

7. The system as defined in claim 6, wherein the data transfer queue includes a plurality of header portions and a corresponding plurality of data portions.

8. The system as defined in claim 6, wherein the size of the data transfer queue is programmably controllable.

9. The system as defined in claim 6, wherein the size of the block of data to be transferred to the geometry accelorator is programmably controllable.

10. The system as defined in claim 7, wherein each header portion includes at least one data ready bit indicative of whether the corresponding data block is ready for transfer to the geometry accelerator.

11. The system as defined in claim 6, wherein the state of the enable bit is controlled by a host processor.

12. The system as defined in claim 6, wherein the state of each data ready bit is set by a host processor.

13. The system as defined in claim 6, wherein the state of each data ready bit is cleared by the geometry accelerator.

14. In a computer graphics system having a host processor in communication with a host memory, and a graphics machine also in communication with the host memory, a method for performing high speed delivery of commands and data from the host memory to the graphics machine comprising the steps of:

(a) identifying a command received from the host processor enabling the start of a direct memory access (DMA) transfer, the command indicating a starting address within the host memory for the transfer;

(b) evaluating a first portion of data that is stored in a fixed location in reference to the starting address to determine whether a first block of data is ready to be processed;

(c) delivering the block of data directly from the host memory to the graphics machine chip for processing, if the evaluating step indicates that the first block of data is ready for processing; otherwise waiting for a time-out period, then returning to the evaluating step;

(d) evaluating a subsequent portion of data that is stored in a fixed location in reference to the previously evaluated portion of data to determine whether a subsequent block of data is ready to be processed; and (e) repeating the delivering and evaluating steps (c) and (d).

15. The method as defined in claim 14, wherein the delivering and evaluating steps (c) and (d) are repeated until the host processor disables the DMA transfer.

16. The method as defined in claim 14, wherein the blocks of data to be transferred to the graphics machine are generally sequentially stored in the host memory in a queue.

17. The method as defined in claim 14, wherein the queue is circular, in that, after a predetermined data block is reached, the location of the next data block for transfer is the same as the location of the first data block transferred.

18. A computer readable storage medium containing program code for controlling a method for performing high speed delivery of commands and data from a host memory to a graphics machine comprising the steps of:

(a) identifying a command received from a host processor enabling the start of a direct memory access (DMA) transfer, the command indicating a starting address within the host memory for the transfer;

(b) evaluating a first portion of data that is stored in a fixed location in reference to the starting address to determine whether a first block of data is ready to be processed;

(c) delivering the block of data directly from the host memory to the graphics machine for processing, if the evaluating step indicates that the first block of data is ready for processing; otherwise waiting for a time-out period, then returning to the evaluating step;

(d) evaluating a subsequent portion of data that is stored in a fixed location in reference to the previously evaluated portion of data to determine whether a subsequent block of data is ready to be processed; and (e) repeating the delivering and evaluating steps (c) and (d).

* * * * *

UNITED STATES PATENT AND TRADEMARK OFFICE
CERTIFICATE OF CORRECTION

PATENT NO. : 6,058,438
DATED : May 2, 2000
INVENTOR(S) : Michael R. Diehl et al.

It is certified that error appears in the above-identified patent and that said Letters Patent is hereby corrected as shown below:

Column 9,
Lines 36, 38, 42, 44, 45, 49, 55, 60 and 64, delete "accelorator" and insert therefor -- accelerator --

Column 10,
Lines 2, 5, 6, 9, 19, 22, 25, 33, 34, 38 and 44, delete "accelorator" and insert therefor -- accelerator --

Signed and Sealed this

Eighteenth Day of June, 2002

Attest:

JAMES E. ROGAN
Attesting Officer    Director of the United States Patent and Trademark Office